Patented Oct. 8, 1935

2,017,000

UNITED STATES PATENT OFFICE 2,017,000

SILICON CARBOXYLATE AND PROCESS OF MAKING THE SAME

Anton Hintermaier, Dusseldorf, Germany, assignor to Henkel & Cie., G. m. b. H., Dusseldorf, Germany No Drawing. Application March 23, 1933, Serial No. 662,391. In Germany April 22, 1932

6 Claims. (Cl. 260—112)

The object of this invention is silicon carboxylates and the process of producing them.

It is already known to manufacture a mixed anhydride of silicic acid and acetic acid by allowing solutions of anhydrous sodium acetate in acetic anhydride to react with silicon tetrachloride. This product, however, has so far failed to find any technical or pharmaceutical application.

It is further known already to manufacture esters of orthosilicic acid by allowing hydroxy compounds to react with silicon halides, and in this connection hydroxy compounds containing carboxyl groups have also been previously employed. The manufacture of carboxylic acid chlorides by allowing solutions of low molecular aliphatic acids or aromatic or aliphatic-aromatic acids in an inert solvent to react with an excess of silicon tetrachloride is also known.

It has now been found that quite a new class of valuable products may be obtained if carboxylic acids with at least 6 carbon atoms in the molecule, or functional derivatives thereof, such as anhydrides, esters or salts, are converted by the action of anhydrides of silicic acid with other acids or silicon halides into the corresponding mixed anhydrides of the higher carboxylic acids and silicic acid.

As higher carboxylic acids, it is possible to employ aliphatic, cycloaliphatic, aromatic, hydroaromatic and heterocyclic carboxylic acids, provided they contain at least 6 carbon atoms in the molecule. For example, it is possible to employ lauric acid, stearic acid, benzoic acid, naphthene acid and the like. Also, mixtures of such acids may be employed, for example, the mixture of carboxylic acids which is obtainable from coconut oil. As silicic anhydrides it is possible to employ for example, silicic-acetic anhydride.

In employing silicic-acetic anhydride, it is not necessary for this compound to be isolated. It may also be prepared in the reaction mass by admixture of the starting substances, for example by mixing acetic acid, acetic anhydride and silicon tetrachloride.

The reaction may be carried out in the presence or absence of inert solvents, and is preferably carried out at an elevated temperature and with the exclusion of water.

The carboxylic acids employed may, in their turn, be substituted by groups of any kind, provided the latter have no detrimental influence upon the reaction. Such groups are, for example, ether groups, thioether groups, halogen atoms and the like.

The mixed anhydrides of carboxylic acids and silicic acid may be employed as such, for example in the pharmaceutical industry. They may also be employed with advantage as starting products for the manufacture of further valuable substances. They may be employed with advantage, for example, for hydrogenation.

Examples (1) 300 grams of stearic acid are heated with 43.5 grams of silicon tetrachloride on the water bath until no more hydrochloric acid escapes. The rest of the hydrochloric acid is then removed by further heating with simultaneous evacuation. The product formed is a white crystalline mass having a melting point of 67 to 68.5° C. It is sensitive to moisture and reacts with water with an intense evolution of heat and separation of gelatinous silicic acid.

Lauric-silicic anhydride may be made in a similar manner.

(2) 18 grams of silicic-acetic anhydride are melted with 70 grams of stearic acid on the water bath. After 2 hours, the silicic-acetic anhydride will have dissolved to form a clear solution. The acetic acid which is formed may be removed by pressing off or by distillation in a vacuum. Stearic-silicic anhydride, having the same properties as stated in Example 1, is obtained.

(3) 33 grams of acetic acid and 56 grams of acetic anhydride are heated with 44 grams of silicon tetrachloride until no more evolution of hydrochloric acid can be observed. The reaction mixture is then heated with 295 grams of stearic acid for 4 hours at 90° C. The clear molten mass obtained is freed from volatile constituents by heating to 250° C. in a vacuum of 2 millimetres. The product obtained is silicic-stearic anhydride and possesses the properties given in Example 1.

(4) 300 grams of coconut fatty acids are heated with 60 grams of silicon tetrachloride on the water bath until there is no more evolution of hydrochloric acid. Any secondary products which may be formed are removed completely by heating the reaction mixture in a high vacuum (200° C.; 2 millimetres pressure). The mixed anhydride obtained is a crystalline whitish mass. It is sensitive to moisture and decomposes with water with the separation of gelatinous silicic acid.

(5) 114 parts of a mixture of propionic acid and propionic anhydride are mixed with 50 parts of silicon chloride and gradually heated to 100° C. After the evolution of hydrochloric acid is ended, the very volatile components of the reaction mixture are distilled off in a vacuum, and 50 parts of the residue (silicic-propionic anhydride) are melted with 178 parts of stearic acid. After heating for one hour at 100° C., the propionic acid is first of all removed at 15 millimetres, and then the slight residue of the remaining volatile products is completely removed in a high vacuum (1 millimetre of mercury) by heating in the oil bath to 250° C. dry carbon dioxide being passed through simultaneously. On cooling the clear molten mass solidifies to a light yellow crystalline substance and consists of silicic-stearic anhydride.

(6) 12.5 parts of silicon tetrabromide are added to 40 parts of stearic acid and heated gradually in the paraffin bath. As soon as the stearic acid begins to melt, the evolution of hydrobromic acid becomes very vigorous, and is practically complete after the lapse of half an hour. The dissolved hydrogen halide and the remaining volatile impurities are removed in a vacuum. The residue consists of silicic-stearic anhydride.

(7) 122 parts of benzoic acid are finely powdered and 46 parts of re-distilled silicon tetrachloride are poured over them. The reaction is accelerated by gradual heating and is finally ended at 120° C. The undecomposed benzoic acid is removed with the other volatile substances in a vacuum, and benzoic-silicic anhydride of the formula $(C_6H_5COO)_4Si$ is obtained as a colourless residue. This compound, like the other substances of this class of bodies, is also extremely sensitive to water.

(8) In the same manner as with the acids mentioned, silicon tetrachloride reacts with acid mixtures. A further experiment was carried out with naphthene acids. On heating a mixture of 200 parts of a clear naphthene acid fraction (acid number 191.1) with 30 parts of silicon tetrachloride, hydrochloric acid is evolved even in the cold. At the boiling point of silicon tetrachloride, the reaction proceeds vigorously and results in a viscous mixture of substances which are to be considered as mixed anhydrides of silicic acid and naphthene acids.

I claim:

1. The process for the preparation of silicon stearate wherein 4 molecules of stearic acid are heated together with 1 molecule of silicic-acetic anhydride.

2. The process for the preparation of silicon carboxylates, comprising heating together 1 molecule of a silicic low-molecular acid anhydride and 4 molecules of a member of the group consisting of a carboxylic acid containing at least 6 carbon atoms in the molecule and an anhydride of a carboxylic acid containing at least 6 carbon atoms in the molecule.

3. A silicon carboxylate of an acid selected from the group consisting of hydroaromatic acids containing at least 7 carbon atoms in the molecule, and fatty acids containing at least 6 carbon atoms in the molecule.

4. Silicon stearate.

5. Silicon naphthenate.

6. A silicon carboxylate of coconut fatty acids.

ANTON HINTERMAIER.